United States Patent [19]
Cho

[11] Patent Number: 6,055,069
[45] Date of Patent: Apr. 25, 2000

[54] METHOD FOR CHANGING RECEPTION MODE IN MULTI-FUNCTION FACSIMILE SYSTEM

[75] Inventor: Gyo-O Cho, Suwon, Rep. of Korea

[73] Assignee: SamSung Electronics Co., Ltd., Suwon, Rep. of Korea

[21] Appl. No.: 08/989,216

[22] Filed: Dec. 11, 1997

[30] Foreign Application Priority Data

Dec. 11, 1996 [KR] Rep. of Korea ....................... 96-64376

[51] Int. Cl.$^7$ ................................................... H04N 1/00
[52] U.S. Cl. .......................................... 358/468; 358/405
[58] Field of Search .................................... 358/468, 442, 358/434, 435, 436, 438, 444, 405, 407; 379/100.01, 100.05, 100.12, 102.03, 112

[56] References Cited

U.S. PATENT DOCUMENTS

| | | | |
|---|---|---|---|
| 4,652,933 | 3/1987 | Koshiishi | 358/256 |
| 4,964,154 | 10/1990 | Shimamoto | 379/100 |
| 5,303,067 | 4/1994 | Kang | 358/442 |
| 5,592,307 | 1/1997 | Murai | 358/468 |
| 5,608,546 | 3/1997 | Nakamura | 358/468 |
| 5,684,607 | 11/1997 | Matsumoto | 358/442 |

FOREIGN PATENT DOCUMENTS

| | | | |
|---|---|---|---|
| 407264345 | 10/1995 | Japan | H04N 1/00 |
| 409139977 | 5/1997 | Japan | H04B 7/26 |

*Primary Examiner*—Jerome Grant, II
*Attorney, Agent, or Firm*—Robert E. Bushnell, Esq.

[57] ABSTRACT

A method of operating a multi-function facsimile system connected to a personal computer (PC) is described. First, if an automatic PC reception mode request is received from the PC, the reception mode of the facsimile system is changed to an automatic PC reception mode. Then, upon receipt of a ring signal from a telephone line in the automatic PC reception mode, the facsimile system transmits ring data to the PC, awaits response data from the PC and then transmits received facsimile data to the PC directly.

5 Claims, 2 Drawing Sheets

METHOD FOR CHANGING RECEPTION MODE IN MULTI-FUNCTION FACSIMILE SYSTEM

CLAIM FOR PRIORITY

This application makes reference to, incorporates the same herein, and claims all benefits accruing under 35 U.S.C. §119 from an application for *METHOD FOR CHANGING RECEPTION MODE IN MULTI-FUNCTION FACSIMILE SYSTEM* earlier filed in the Korean Industrial Property Office on Dec. 11, 1996, and there duly assigned Ser. No. 64376/1996, a copy of which application is annexed hereto.

BACKGROUND OF THE INVENTION

1. Technical Field

The present invention relates to a multi-function facsimile system in connection with a personal computer ("PC") through a cable, and more particularly to a method for changing a reception mode of a multi-function facsimile system from a normal facsimile reception mode into an automatic PC reception mode in accordance with a request from the PC.

2. Related Art

Conventional facsimile systems available in the market today contain a long list of sophisticated options for the convenience of users. One convenience option for use at home or at the office is to combine a multi-function facsimile system with a personal computer (PC) to permit transfer of image data between the facsimile system and the PC. Exemplary combinations of such a facsimile system and a personal computer (PC) are disclosed in U.S. Pat. No. 4,652,933 for *Image Information Processing System* issued to Koshiishi, U.S. Pat. No. 4,964,154 for *Communication Adapter Device For Use With A Facsimile Device Combined With A Computer* issued to Shimotono, U.S. Pat. No. 5,303,067 for *Computer Connection Circuit In Facsimile* issued to Kang et al., U.S. Pat. No. 5,608,546 for *Data Communications Apparatus Having A Computer Modem Function* issued to Nakamura et al., and U.S. Pat. No. 5,684,607 for *Facsimile Apparatus Using A Small Computer System Interface* issued to Matsumoto.

Typically, the multi-function facsimile system connected to a personal computer PC operates in two reception modes: a normal reception (facsimile reception) mode in which the facsimile system operates alone to receive documents from a remote data communication system (e.g., a remote facsimile system) without performing any data communications with the PC; and an automatic PC reception mode in which the facsimile system performs data communications with the PC. The changeover between these two modes can be made either manually by the user by way of an operation panel provided on the facsimile system or by way of an internal controller of the PC. However, as I have observed that, when the automatic PC reception mode is set by the PC, the reception mode must also be changed in the facsimile system in order to transmit image data of an incoming call separately to the PC. Therefore, if image data is to be received in the PC, the user must manipulate the PC directly to receive the image data or connect a line to the PC in order to permit the PC to sense an incoming call from the multi-function facsimile system. As described however, one significant disadvantage of the conventional facsimile system is that, despite the setting of the automatic PC reception mode, user manipulation is required to receive image data in the PC.

SUMMARY OF THE INVENTION

Accordingly, it is therefore an object of the present invention to provide a multi-function facsimile system connected to a personal computer PC via a cable for effective changeover from a normal facsimile reception mode to an automatic PC reception mode.

It is also an object to provide a method for automatically changing a mode of the facsimile if the automatic PC reception mode is established by the PC.

These and other objects of the present invention can be achieved by a method of operating a multi-function facsimile system connected to a personal computer (PC) via a cable by receiving an automatic PC reception mode request from the PC; changing a reception mode to an automatic PC reception mode on receipt of the automatic PC reception mode request; and upon receipt of a ring signal from a telephone line during the automatic PC reception mode, transmitting image data received from the telephone line to the PC.

As contemplated by the present invention, the multi-function facsimile system which is operable both in a facsimile reception mode and an automatic PC reception mode, may use a communication link for connecting the facsimile system to a personal computer (PC); and a controller adapted to receive an automatic PC reception mode request via the communication link; to change a reception mode to the automatic PC reception mode upon receipt of the automatic PC reception mode request; and upon receipt of a ring signal from a telephone line while in the automatic PC reception mode, to transmit facsimile data received from the telephone line to the PC.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
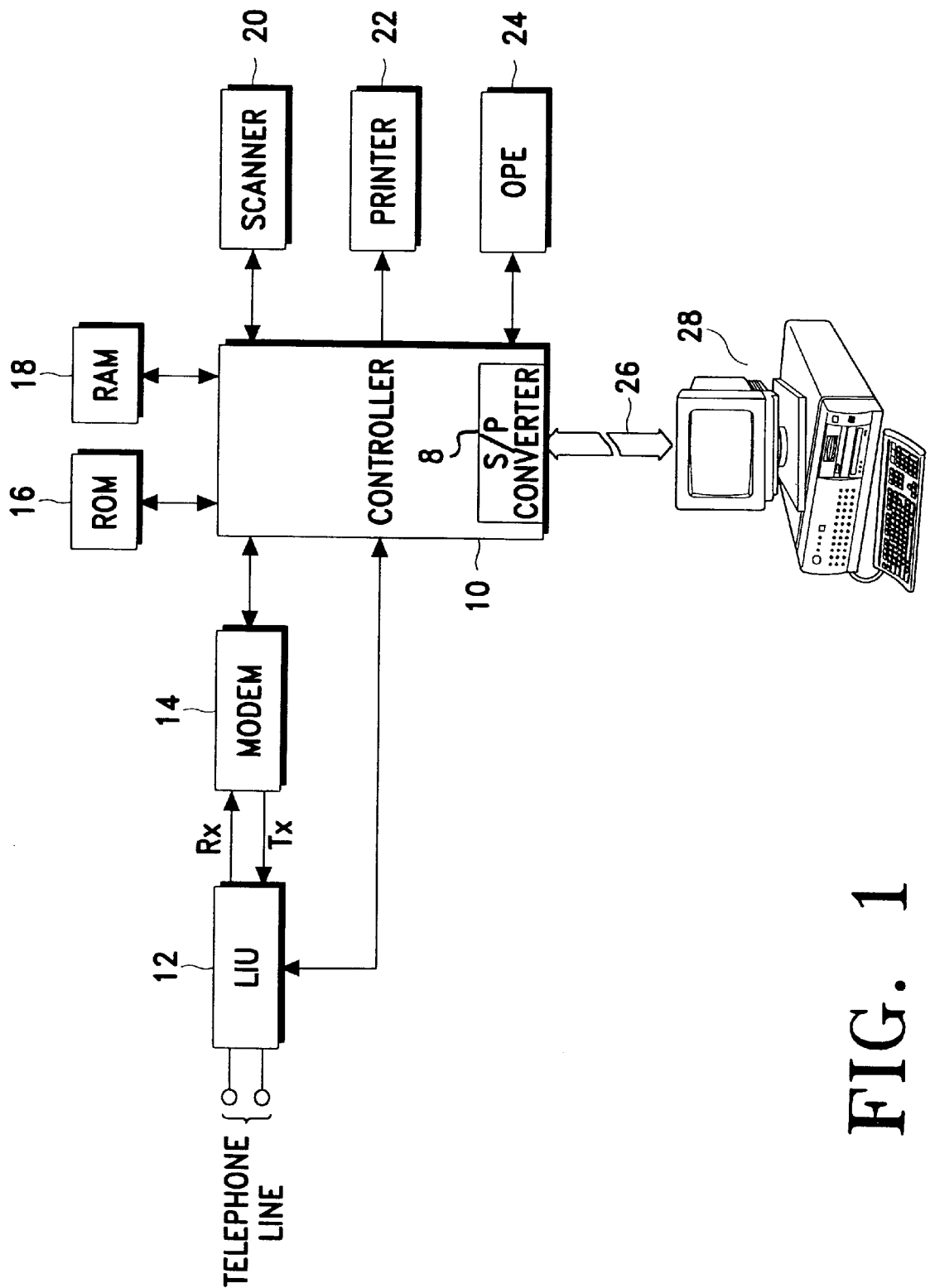
FIG. 1 is a block diagram of a multi-function facsimile system connected to a personal computer PC via a cable according to the principles of the present invention.

Referring now to the drawings and particularly to FIG. 1, which illustrates a multi-function facsimile system connected to a personal computer PC 28 via a cable 26 according to the principles of the present invention. As shown in FIG. 1, the multi-function facsimile system includes a controller 10 having therein a serial/parallel converter 8, line interface unit (LIU) 12 connected to a tip and a ring terminal of a telephone line, a modem 14, a read-only-memory (ROM) 16, a random-access-memory (RAM) 18, a scanner 20, a printer 22, an operating panel (OPE) 24 including a display unit, and a cable 26 such as an RS-232C cable.

The controller 10 includes a central processing unit (CPU) for controlling overall operations of the facsimile system including transmission or reception of image data from another facsimile transmission source, and the changeover between a facsimile reception mode and an automatic PC reception mode in accordance with programs stored in ROM 16. The controller 10 also includes a serial/parallel converter 8 for converting serial data to parallel data for data processing. The RAM 18 temporarily stores a variety of items of data information, and image data reflecting the facsimile document received from the predetermined facsimile transmission source.

The OPE 24 includes a key input unit and a display unit. The key input unit of the OPE 24 comprises a plurality of discrete keys including a dial key for generating key data to the controller 10 to dial a telephone number of another facsimile system, and at least a changeover key for permitting the operator to manually change a reception mode of the facsimile system. The display unit of the OPE 24 displays data indicating various modes of operations of the facsimile system. The scanner 20 transports and scans an image of the input document and then generates image data corresponding to the scanned image. The image data output from the scanner 20 is then processed for either transmission via a telephone line or copy during the copy mode under control of the controller 10. The printer 22 prints the processed image data received from the LIU 12 on a printable medium such as individual cut sheets of papers during the reception mode and the copy mode under the control of the controller 10. The modem 14 modulates the processed image data output from the controller 10 into a modulated image signal for transmission, and duplicates the image signal input to the controller 10 during the reception mode (e.g., a facsimile reception mode or an automatic PC reception mode) under the control of the controller 10. The LIU 12 is connected with a tip and a ring terminal of a telephone line to form transmission and reception paths for the modem 14 under the control of the controller 10.

The cable 26 connects a personal computer (PC) 28 to the facsimile system and is used as a transmission path for communicating various data, including facsimile data (i.e. image data received through the telephone line). The PC 28 converts parallel data into serial data and then transmits the serial data through the cable 26, thus performing data communication. Further, the PC includes an application program, for example WinFax Lite, for performing transmission and reception operations with the facsimile system and thus receives and records document data transmitted through the cable 26.

Figure 2:
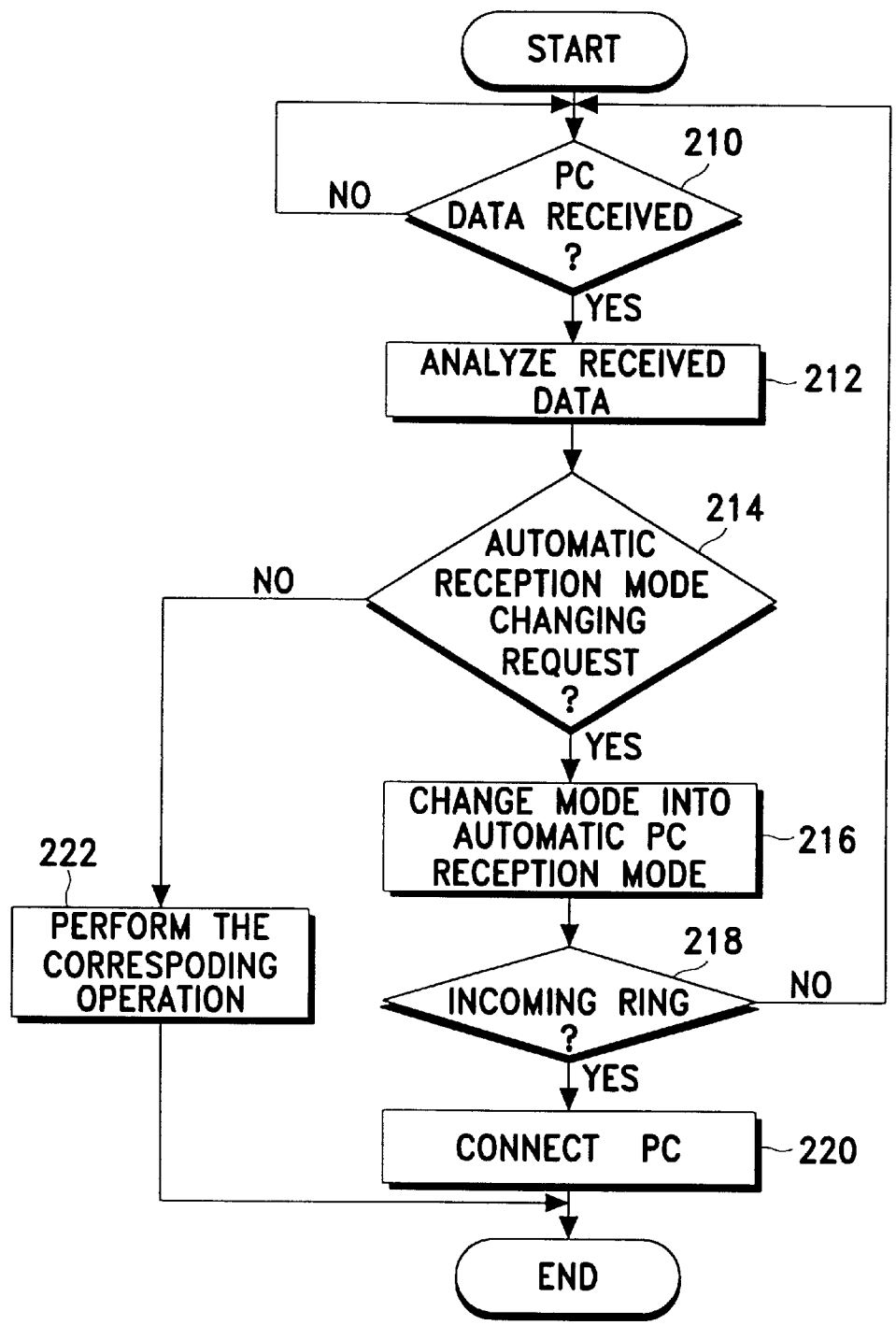
FIG. 2 is a flow chart of a process of changing a reception mode in a multi-function facsimile system according to the principles of the present invention.

The operation of the automatic PC reception mode of the facsimile system according to the principles of the present invention will now be described in detail with reference to FIGS. 1 and 2 hereinbelow.

First, the user must boot the PC 28 and run an application program, such as WinFax Lite, in order for a menu to be displayed on a screen. If the user selects the automatic PC reception mode from the displayed modes using a mouse, data is generated by the application program, which indicates that a reception operation can be automatically performed as a CLASS 1 command (such data is denoted as "automatic reception data"). Then, the PC 28 converts the above automatic reception data, i.e. parallel data, into serial data send transmits the converted serial data to the controller 10 of the facsimile through the cable 26.

The serial data is converted to parallel data by the serial/parallel converter within the controller 10 of the facsimile system. In the controller 10 of the facsimile system, a response signal to the converted parallel data is transmitted to the PC 28 through the serial/parallel converter, and then the data transmitted through the cable 26 is received, thus setting the automatic PC reception mode.

Thereafter, the controller 10 of the facsimile system periodically checks whether there is any data received from the PC 28 at step 210. If data is received from the PC 28 at step 210, the controller 10 proceeds to analyze the received data at step 212. Then, the controller 10 transmits a response signal in response to the received data to the PC 28. For example, if data AT<CR> is received from the PC 28, the controller 10 transmits a response signal <CR><LF>OK<CR><LF> to the PC 28. Then, the PC 28 transmits a signal AT+PCLASS=O<CR> to the controller 10 of the facsimile system and then, the controller 10 again transmits a response signal <CR><LF>OK<CR><LF> to the PC 28. Thereafter, if the PC 28 sends a signal AT+PCLASS=1<CR> to the controller 10 of the facsimile system, the controller 10 transmits a response signal <CR><LF>OK<CR><LF> to the PC 28, once again. Additionally, if the PC 28 transmits a signal ATZ<CR> to the controller 10 of the facsimile system, the controller 10 sends a response signal <CR><LF>OK<CR><LF> to the PC 28.

As described, after performing reciprocal data communication between the controller 10 of the facsimile system and the PC 28, the controller 10 proceeds to step 214 to determine whether there is an automatic reception mode change request. If there is no automatic reception mode change request, the controller 10 proceeds to step 222, to perform an operation corresponding to the analyzed data.

If, on the other hand, there is an automatic reception mode change request at step 214, the controller 10 proceeds to step 216, to change the current reception mode into an automatic PC reception mode. After the reception mode is changed into the automatic PC reception mode, the controller 10 performs its operation in accordance with the automatic PC reception mode at steps 218 and 220. Thus, the controller 10 proceeds to step 218, to check whether an incoming call is detected from the telephone line via the LIU 12. If an incoming ring is detected from the telephone line, the controller 10 proceeds to step 220, sends a signal <CR><LF>RING<CR><LF> to the PC 28 and connects with the PC 28 to provide the PC 28 with received facsimile data.

The following is a more detailed description of step 220. The controller 10 generates ring data corresponding to the incoming ring and then transmits a signal <CR><LF>RING<CR><LF> to the PC 28 via the cable 26. The transmitted ring data is received through the serial port and then provided to the CPU. After transmitting the ring data to the PC 28, the controller 10 checks whether a response is received from the PC 28. The controller 10 continues to check whether a response is detected from the PC 28 until a predetermined number of rings is reached or the reception of the incoming ring has finished. The response from the PC 28 may be a signal indicating that facsimile documents can be transmitted, i.e. a request for the transmission of data corresponding to the facsimile documents. If the above response from the PC 28 is detected, the controller 10 transmits the facsimile documents, received through the telephone line, the LIU 12 and the modem 14, to the cable 26. The PC 28 receives the transmitted documents and then the facsimile data corresponding to the documents can be provided to the user by a printing operation or by being output to a monitor.

As stated above, if the automatic reception mode is established in the conventional PC, the user must manually change the reception mode to provide the PC with the ring signal. On the other hand, in the present invention, the controller 10 establishes whether to provide the PC with facsimile data using data transmitted from the PC and then, if an incoming ring is detected, an automatic reception operation can be performed. Therefore, with the present invention, the user can receive facsimile data using the PC without manual intervention in the multi-function facsimile system.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A method of operating a multi-function facsimile system connected to a personal computer (PC) via a cable, comprising the steps of:

receiving an automatic PC reception mode request from the personal computer;

changing a reception mode of the facsimile system to an automatic PC reception mode upon receipt of the automatic PC reception mode request; and upon receipt of a ring signal from a telephone line indicating an incoming call, transmitting facsimile data received from the telephone line directly to the personal computer while in the automatic PC reception mode.

2. The method of claim 1, wherein said facsimile data received from the telephone line is transmitted to the personal computer by first transmitting ring data to the personal computer, receiving response data from the personal computer for confirmation, and finally transmitting the facsimile data to the personal computer.

3. A multi-function facsimile system operable in a facsimile reception mode and an automatic PC reception mode, comprising:

a communication link for connecting the facsimile system to a personal computer;

an operational panel including a keyboard comprising a plurality of discrete keys that are independently operable by manual depression by a user to control operation of said facsimile system, and a display unit for providing a visual display of the operation of said facsimile system;

input means coupled to tip and ring terminals of telephone lines connected to a telephone network, for receiving an incoming call from a remote communication system; and controller means for controlling a changeover between a facsimile reception mode and an automatic PC reception mode for data communications with the personal computer, said controller means controlling the changeover by:

receiving an automatic PC reception mode request from the personal computer via the communication link;

changing a current reception mode of the facsimile system into the automatic PC reception mode upon receipt of the automatic PC reception mode request; and upon receipt of a ring signal indicative of the incoming call, transmitting facsimile data received from the telephone line directly to the personal computer while in the automatic PC reception mode.

4. A method of changeover between a facsimile reception mode and an automatic PC reception mode in a facsimile system connected to a computer system via a cable, said method comprising the steps of:

transmitting data, from said computer system, requesting a changeover of said facsimile system from a facsimile reception mode to an automatic PC reception mode;

changing reception mode of said facsimile system from said facsimile reception mode to said automatic PC reception mode, when said data requesting said changeover is received from said computer system; and transmitting ring data to said computer system so that said computer system receives facsimile data received from said facsimile system, in response to an incoming call after said changeover of said facsimile system from said facsimile reception mode to said automatic PC reception mode.

5. A method of operating a multi-function facsimile system connected to a personal computer via a cable, comprising the steps of:

while in a first reception mode, receiving facsimile data from a telephone line operationally coupled to said facsimile system;

printing images corresponding to said facsimile data onto printable media;

receiving an automatic PC reception mode request from the personal computer;

changing said first reception mode of said facsimile system to an automatic PC reception mode upon receipt of the automatic PC reception mode request; and upon receipt of a ring signal from a telephone line indicating an incoming call, transmitting facsimile data received from the telephone line directly to the personal computer while said facsimile system is in the automatic PC reception mode in response to reception by said facsimile system of a request generated by said personal computer for transmission of data corresponding to said facsimile data.

* * * * *